(12) United States Patent
Naganathan

(10) Patent No.: US 12,067,037 B1
(45) Date of Patent: Aug. 20, 2024

(54) SYSTEM, METHOD, AND COMPUTER PROGRAM FOR PERFORMING NATURAL LANGUAGE SEARCHES FOR DOCUMENTS IN A DATABASE USING ALTERNATE SEARCH SUGGESTIONS

(71) Applicant: Apttus Corporation, San Mateo, CA (US)

(72) Inventor: Venkatraman Naganathan, San Jose, CA (US)

(73) Assignee: Apttus Corporation, San Mateo, CA (US)

( * ) Notice: Subject to any disclaimer, the term of this patent is extended or adjusted under 35 U.S.C. 154(b) by 58 days.

(21) Appl. No.: 17/683,109

(22) Filed: Feb. 28, 2022

(51) Int. Cl.
*G06F 16/00* (2019.01)
*G06F 16/33* (2019.01)
*G06F 16/332* (2019.01)

(52) U.S. Cl.
CPC ...... *G06F 16/3322* (2019.01); *G06F 16/3329* (2019.01); *G06F 16/3334* (2019.01)

(58) Field of Classification Search
CPC ............. G06F 16/3322; G06F 16/3334; G06F 16/3329
USPC ....................................................... 707/767
See application file for complete search history.

(56) References Cited

U.S. PATENT DOCUMENTS

| | | | |
|---|---|---|---|
| 5,960,407 A | 9/1999 | Vivona | |
| 6,253,194 B1 | 6/2001 | Johnson et al. | |
| 6,473,084 B1 | 10/2002 | Phillips et al. | |
| 7,328,177 B1 | 2/2008 | Lin-Hendel | |
| 7,574,381 B1 | 8/2009 | Lin-Hendel | |
| 7,693,762 B1 | 4/2010 | Dagum et al. | |

(Continued)

FOREIGN PATENT DOCUMENTS

| | | |
|---|---|---|
| CA | 2742395 | 1/2019 |
| CN | 1315705 | 3/2001 |

(Continued)

OTHER PUBLICATIONS

Lenis, Alicia "Developing Product Configurators for Use in a Multinational Industrial Goods Company", MIT, May 2013, pp. 1-87.

(Continued)

*Primary Examiner* — Monica M Pyo
(74) *Attorney, Agent, or Firm* — Lessani Law Group, PC (57) ABSTRACT

A system, method, and computer program are provided for performing natural language searches for documents in a database using alternate search suggestions. The system receives a user's natural language query to search a document database and processes the natural language query to map natural language terms to terms for a database query. The system identifies a term in the user's natural language query that the system is unable to map to terms for a database query and determines that the unmapped term is a candidate document keyword term. The system provides an alternate natural language input search suggestion and, in response to user acceptance, the system creates a database query that includes a metadata subquery with database metadata terms and a document keyword subquery that includes the candidate document keyword term. The system resolves the user's natural language query by performing metadata and document keyword searches on the document database.

12 Claims, 4 Drawing Sheets

(56) References Cited

U.S. PATENT DOCUMENTS

| | | |
|---|---|---|
| 7,725,358 B1 | 5/2010 | Brown et al. |
| 8,498,954 B2 | 7/2013 | Malov et al. |
| 8,583,675 B1 | 11/2013 | Haahr et al. |
| 8,644,842 B2 | 2/2014 | Arrasvuori et al. |
| 9,098,569 B1 | 8/2015 | Bhagat |
| 9,495,222 B1 | 11/2016 | Jackson |
| 9,519,907 B2 | 12/2016 | Carter, III et al. |
| 10,102,199 B2 | 10/2018 | Bailey et al. |
| 10,289,261 B2 | 5/2019 | Aggarwal et al. |
| 10,521,491 B2 | 12/2019 | Krappe et al. |
| 10,621,640 B2 | 4/2020 | Krappe et al. |
| 10,783,575 B1 | 9/2020 | Krappe et al. |
| 11,061,948 B2 | 7/2021 | Su et al. |
| 11,232,508 B2 | 1/2022 | Krappe |
| 11,302,314 B1 | 4/2022 | Jawale et al. |
| 11,455,373 B2 | 9/2022 | Krappe et al. |
| 11,475,053 B1 | 10/2022 | Das et al. |
| 11,550,786 B1 | 1/2023 | Naganathan et al. |
| 11,573,989 B2 | 2/2023 | Bailey et al. |
| 11,604,799 B1 | 3/2023 | Bigdelu et al. |
| 11,615,080 B1 | 3/2023 | Naganathan et al. |
| 11,615,089 B1 | 3/2023 | Naganathan et al. |
| 11,625,436 B2 | 4/2023 | Kang et al. |
| 11,720,563 B1 | 8/2023 | Khan et al. |
| 11,720,951 B2 | 8/2023 | Krappe |
| 2002/0040332 A1 | 4/2002 | Maari et al. |
| 2003/0033240 A1 | 2/2003 | Balson et al. |
| 2004/0158560 A1* | 8/2004 | Wen .............. G06F 16/3338 |
| 2006/0100912 A1 | 5/2006 | Kumar et al. |
| 2006/0136470 A1 | 6/2006 | Dettinger et al. |
| 2007/0016536 A1 | 1/2007 | Mirlas et al. |
| 2007/0039209 A1 | 2/2007 | White et al. |
| 2007/0087756 A1 | 4/2007 | Hoffberg |
| 2007/0156669 A1 | 7/2007 | Marchisio et al. |
| 2007/0162373 A1 | 7/2007 | Kongtcheu |
| 2007/0294157 A1 | 12/2007 | Singla et al. |
| 2008/0046355 A1 | 2/2008 | Lo |
| 2008/0091551 A1 | 4/2008 | Olheiser et al. |
| 2008/0177717 A1* | 7/2008 | Kumar .............. G06F 16/3322 |
| 2009/0024613 A1* | 1/2009 | Niu .............. G06F 16/3338 |
| | | 707/999.005 |
| 2009/0048937 A1 | 2/2009 | Contreras et al. |
| 2009/0222319 A1 | 9/2009 | Cao et al. |
| 2009/0234710 A1 | 9/2009 | Belgaied Hassine et al. |
| 2009/0299974 A1 | 12/2009 | Kataoka et al. |
| 2009/0327166 A1 | 12/2009 | Carter, III et al. |
| 2010/0179859 A1 | 7/2010 | Davis et al. |
| 2010/0262478 A1 | 10/2010 | Bamborough et al. |
| 2010/0306120 A1 | 12/2010 | Ciptawilangga |
| 2011/0083079 A1 | 4/2011 | Farrell et al. |
| 2011/0179075 A1 | 7/2011 | Kikuchi et al. |
| 2011/0246136 A1 | 10/2011 | Haratsch et al. |
| 2011/0246434 A1 | 10/2011 | Cheenath et al. |
| 2011/0246465 A1 | 10/2011 | Koister et al. |
| 2012/0173384 A1 | 7/2012 | Herrmann et al. |
| 2012/0221410 A1 | 8/2012 | Bennett et al. |
| 2012/0246035 A1 | 9/2012 | Cross et al. |
| 2012/0254092 A1 | 10/2012 | Malov et al. |
| 2012/0254143 A1 | 10/2012 | Varma et al. |
| 2012/0259801 A1 | 10/2012 | Ji et al. |
| 2013/0103391 A1 | 4/2013 | Millmore et al. |
| 2013/0132273 A1 | 5/2013 | Stiege et al. |
| 2013/0304757 A1* | 11/2013 | Gebhard .............. G06F 16/3322 |
| | | 707/767 |
| 2014/0025529 A1 | 1/2014 | Honeycutt et al. |
| 2014/0040275 A1* | 2/2014 | Dang .............. G06F 16/2228 |
| | | 707/741 |
| 2014/0136443 A1 | 5/2014 | Kinsey, II et al. |
| 2014/0149273 A1 | 5/2014 | Angell et al. |
| 2014/0181084 A1 | 6/2014 | Herron |
| 2014/0379755 A1* | 12/2014 | Kuriakose .......... G06F 16/24522 |
| | | 707/780 |
| 2015/0120526 A1 | 4/2015 | Peterffy et al. |
| 2015/0142704 A1 | 5/2015 | London |
| 2015/0193447 A1 | 7/2015 | Voinea et al. |
| 2015/0309705 A1 | 10/2015 | Keeler et al. |
| 2015/0310005 A1* | 10/2015 | Ryger .............. G06F 16/9535 |
| | | 707/750 |
| 2015/0310114 A1* | 10/2015 | Ryger .............. G06F 16/93 |
| | | 707/728 |
| 2015/0310115 A1* | 10/2015 | Ryger .............. G06F 16/9535 |
| | | 707/708 |
| 2015/0348551 A1 | 12/2015 | Gruber et al. |
| 2015/0378156 A1 | 12/2015 | Kuehne |
| 2016/0034923 A1 | 2/2016 | Majumdar et al. |
| 2016/0179781 A1 | 6/2016 | Boss et al. |
| 2016/0360336 A1 | 12/2016 | Gross et al. |
| 2017/0004588 A1 | 1/2017 | Isaacson et al. |
| 2017/0068670 A1 | 3/2017 | Orr et al. |
| 2017/0124176 A1 | 5/2017 | Beznos et al. |
| 2017/0124655 A1 | 5/2017 | Crabtree et al. |
| 2017/0192991 A1 | 7/2017 | Touma et al. |
| 2017/0235732 A1 | 8/2017 | Williams et al. |
| 2017/0243107 A1 | 8/2017 | Jolley et al. |
| 2017/0351241 A1 | 12/2017 | Bowers et al. |
| 2017/0358024 A1 | 12/2017 | Mattingly et al. |
| 2018/0005208 A1 | 1/2018 | Aggarwal et al. |
| 2018/0096406 A1 | 4/2018 | Krappe et al. |
| 2018/0218032 A1 | 8/2018 | Wong et al. |
| 2018/0285595 A1 | 10/2018 | Jessen |
| 2018/0293640 A1 | 10/2018 | Krappe |
| 2018/0336247 A1 | 11/2018 | Ignatyev et al. |
| 2018/0349324 A1 | 12/2018 | Krappe et al. |
| 2018/0349377 A1 | 12/2018 | Verma et al. |
| 2019/0139434 A1 | 5/2019 | DeLuca |
| 2019/0171728 A1 | 6/2019 | Wakankar et al. |
| 2019/0258632 A1 | 8/2019 | Pal et al. |
| 2019/0354604 A1 | 11/2019 | Filonov et al. |
| 2019/0370388 A1 | 12/2019 | Li et al. |
| 2020/0004784 A1 | 1/2020 | Okura et al. |
| 2020/0019632 A1 | 1/2020 | Larchev et al. |
| 2020/0057946 A1 | 2/2020 | Singaraju et al. |
| 2020/0065354 A1 | 2/2020 | Krappe et al. |
| 2020/0293521 A1 | 9/2020 | Kussmaul et al. |
| 2020/0334241 A1 | 10/2020 | Muralidhar et al. |
| 2020/0410007 A1 | 12/2020 | Kawaguchi |
| 2021/0019309 A1 | 1/2021 | Yadav et al. |
| 2021/0049212 A1 | 2/2021 | Weber et al. |
| 2021/0064483 A1 | 3/2021 | Paramasivam et al. |
| 2021/0089587 A1 | 3/2021 | Gupta et al. |
| 2021/0090575 A1 | 3/2021 | Mahmood et al. |
| 2021/0107141 A1 | 4/2021 | Shrivastava et al. |
| 2021/0241301 A1 | 8/2021 | Christensen et al. |
| 2021/0374263 A1 | 12/2021 | Maycotte et al. |
| 2022/0035867 A1 | 2/2022 | Tambi et al. |
| 2022/0148071 A1 | 5/2022 | Krappe |
| 2022/0180060 A1 | 6/2022 | Jain et al. |
| 2022/0318223 A1 | 10/2022 | Ahluwalia et al. |
| 2023/0205996 A1 | 6/2023 | Atallah et al. |

FOREIGN PATENT DOCUMENTS

| | | |
|---|---|---|
| CN | 106910091 | 6/2017 |
| EP | 2650776 | 10/2013 |
| EP | 3073421 | 9/2016 |
| JP | 2001290977 | 10/2001 |
| JP | 2017146909 | 8/2017 |
| WO | 0052605 | 9/2000 |
| WO | 03003146 | 1/2003 |
| WO | 2005006122 | 1/2005 |
| WO | 2015106353 | 7/2015 |

OTHER PUBLICATIONS

Oracle: Automating the Quote-to-Cash Process: An Oracle White Paper, Jun. 2009, pp. 1-19, 2009.

McCormick, M., "What is Quote to Cash?" Jan. 20, 2016, Blog, BlackCurve, pp. 1-8, 2016.

Microsoft/APTTUS: Ultimate Guide to Quote-To-Cash for Microsoft Customers, Web Archives, Oct. 1, 2015, pp. 1-28.

Morelli et al., "IBM SPSS Predictive Analytics: Optimizing Decisions at the point of impact", pp. 1-59, 2010.

(56) References Cited

OTHER PUBLICATIONS

Riggins, J., "Interview Quote-to-Cash Pioneers Apttus Links Leads to Revenue", May 21, 2014, pp. 1-7.
Spedicato, G., et al., Machine Learning Methods to Perform Pricing Optimization. A Comparison with Standard GLMs, Dec. 2018, pp. 1-21.
Wainewright, Phil, "Salesforce, Microsoft quote-to-cash partner Apttus raises $88m", Sep. 29, 2016, pp. 1-7.
Wainewright, Phil, Apttus Applies Azure Machine Learning to Quote-to-Cash, Apr. 3, 2016, pp. 1-5.
Wireless News: Banglalink Keeps Mobile Subscribers Using Predictive Analytics with KXEN, Close-Up Media, Inc., pp. 1-2, Oct. 5, 2013.
Xie, Qitao et al., "Chatbot Application on Cryptocurrency", 2019 IEEE Conference on Computational Intelligence for Financial Engineering & Economics, pp. 1-8, 2019.
Karnstedt, Marcel et al., "Semantic Caching in Ontology-based Mediator Systems", 2003, 16 pages.
Patzold, Torsten "Controlling Instruments for Price Management: A Single Case Study on a B2B Company in the OEM Business Operating in the German Electrical/Electronics Industry", Sep. 2018, pp. 1-339.
Raviteja1452, infix_evaluation_using_two_stacks, Apr. 3, 2017, 4 pages.

\* cited by examiner

Example Method for Generating Alternate Natural Language (NL) Input Search Suggestion

SYSTEM, METHOD, AND COMPUTER PROGRAM FOR PERFORMING NATURAL LANGUAGE SEARCHES FOR DOCUMENTS IN A DATABASE USING ALTERNATE SEARCH SUGGESTIONS

BACKGROUND OF THE INVENTION

1. Field of the Invention

This invention relates generally to database queries and, more specifically, to a system and method for performing natural language searches for documents in a database using alternate search suggestions.

2. Description of the Background Art

With the advent of natural language chatbots, such as SIRI and ALEXA, users are increasingly employing bots to complete routine tasks, such as playing music, checking the weather, etc. Natural language bots are typically used in the consumer space, and they are designed to work with search engines that perform searches based on natural language key words.

Natural language bots can also be useful in business-to-business (B2B) applications. However, B2B systems are driven by heavy-duty data that is powered by complex databases, and chatbots are not designed to interface with such databases. One cannot query such a database using natural language key words due to the variability, complexity, and inherent ambiguity in natural language utterances.

Accessing data in B2B database requires a highly-structured database query language, such as SQL. A typical database query will reference a database object (e.g., a database table), one or more subject fields corresponding to a database object, one or more conditions referencing database fields, and sort/order by criteria. There are no implicit fields, semantic ambiguity, or fuzzy terms in a database query (see description of implicit fields, semantic ambiguity, and fuzzy terms below).

The highly-structured and complex nature of database queries present a challenge for natural language bots. Natural language queries are relatively unstructured and highly variable. For example:

Terms that might correspond to database fields can appear anywhere in a natural language query and some may be referred to only implicitly. For example, in the request, "show me quotes over $20k from last year", the price and created date fields are not specified explicitly even though the $20k implicitly refers to the quoted price and "from last year" implicitly refers to the date the quote was created.

Keywords in a natural language query can have multiple meanings, depending on the context. For example, the word "created" could be used to refer to a person that created an object/file or a date on which the object/file was created.

Ambiguity is inherent in natural language, and the database field to which a term corresponds depends on context. For example, take the following two phrases:

"Show me agreements I created."

"Show me agreements I created last year."

"Show me agreements that were created last year."

Assume the database object for agreements has the fields "createdBy" and "createdDate." Then, in the first two phrases, the entity "created" should be mapped to the "createdBy" field, and in the last phrase the entity "created" should be mapped to the "createdDate" field.

There are many different ways to express the same request, including many variations in the way object names, operators, operands, and conditions may be expressed. For example, the following two phrases ask for the same thing:

"Show me the last 3 agreements over $200k from last year that I created in Q4 2020."

"Show me the most recent 3 agreements from 2020 that I created in the 4th quarter with an account value greater than $200k."

Phrases may be fuzzy, such as "a couple of weeks ago," "in a few months," "around $200k," etc.

A natural language bot for a B2B application must be able to effectively translate a natural language query to a database query. Known natural language bots use rudimentary natural language processing to parse part of a sentence, which, when used as an interface to a B2B database, results in an incomplete translation of the natural language query to a database query. This leads to incorrect or suboptimal results.

Therefore, there is demand for a system that can effectively translate a natural language query to a database query in B2B applications. During translation, however, the system is sometimes unable to map one or more terms from the natural language query to the database query, which limits the accuracy of the translation and the effectiveness of the query. Therefore, there is a need for a system that can additionally provide alternate natural language input search suggestion(s) for the one or more unmapped terms to incorporate into the database query upon the user's acceptance of such suggestion(s).

SUMMARY OF THE DISCLOSURE

The present disclosure describes a system, method, and computer program for performing natural language searches for documents in a database using alternate search suggestions. The method is performed by a computer system that includes servers, storage systems, networks, operating systems, and databases.

The present invention describes a system and method for providing alternate natural language search suggestions for documents in a document database. The system receives a natural language query for documents in a database and processes the natural language query to map language terms to terms for a database query as well as identify a document database object. The system identifies one or more terms in the natural language query that it is unable to map to terms for a database query. If the unmapped terms are in a keyword dictionary, the system determines that the unmapped terms are candidate document keyword terms and provides an alternate natural language input search suggestion that includes a search for instances of the document database object that includes the candidate document keyword terms. If the user accepts the alternate natural language input search suggestion, the system creates a database query that includes a keyword subquery with the candidate document keyword terms and resolves the user's natural language query using the database query.

In one embodiment, a method for performing natural language searches for documents in a database using alternate search suggestions comprises the following steps:

receiving a user's natural language query for a search of a document database;

processing the natural language query to map natural language terms to terms for a database query, including:

mapping one or more natural language terms to one or more database metadata query terms; and identifying a document database object that is the subject of the user's natural language query;

identifying a term in the user's natural language query that the system is unable to map to terms for a database query;

determining that the unmapped term is a candidate document keyword term;

providing an alternate natural language input search suggestion, wherein the suggestion includes a search for instances of the document database object that includes the candidate document keyword term;

in response to the user accepting the alternate natural language input search suggestion, creating a database query that includes a metadata subquery with database metadata terms and a document keyword subquery that includes the candidate document keyword search term; and resolving the user's natural language query by performing metadata and document keyword searches on the document database based on the metadata subquery and the document keyword subquery.

DETAILED DESCRIPTION OF THE PREFERRED EMBODIMENTS

The present disclosure describes a system, method, and computer program for performing natural language searches for documents in a database using alternate search suggestions. The method is performed by a computer system that includes servers, storage systems, networks, operating systems, and databases ("the system").

Example implementations of the methods are described in more detail with respect to FIGS. 1A-3.

Figure 1A:
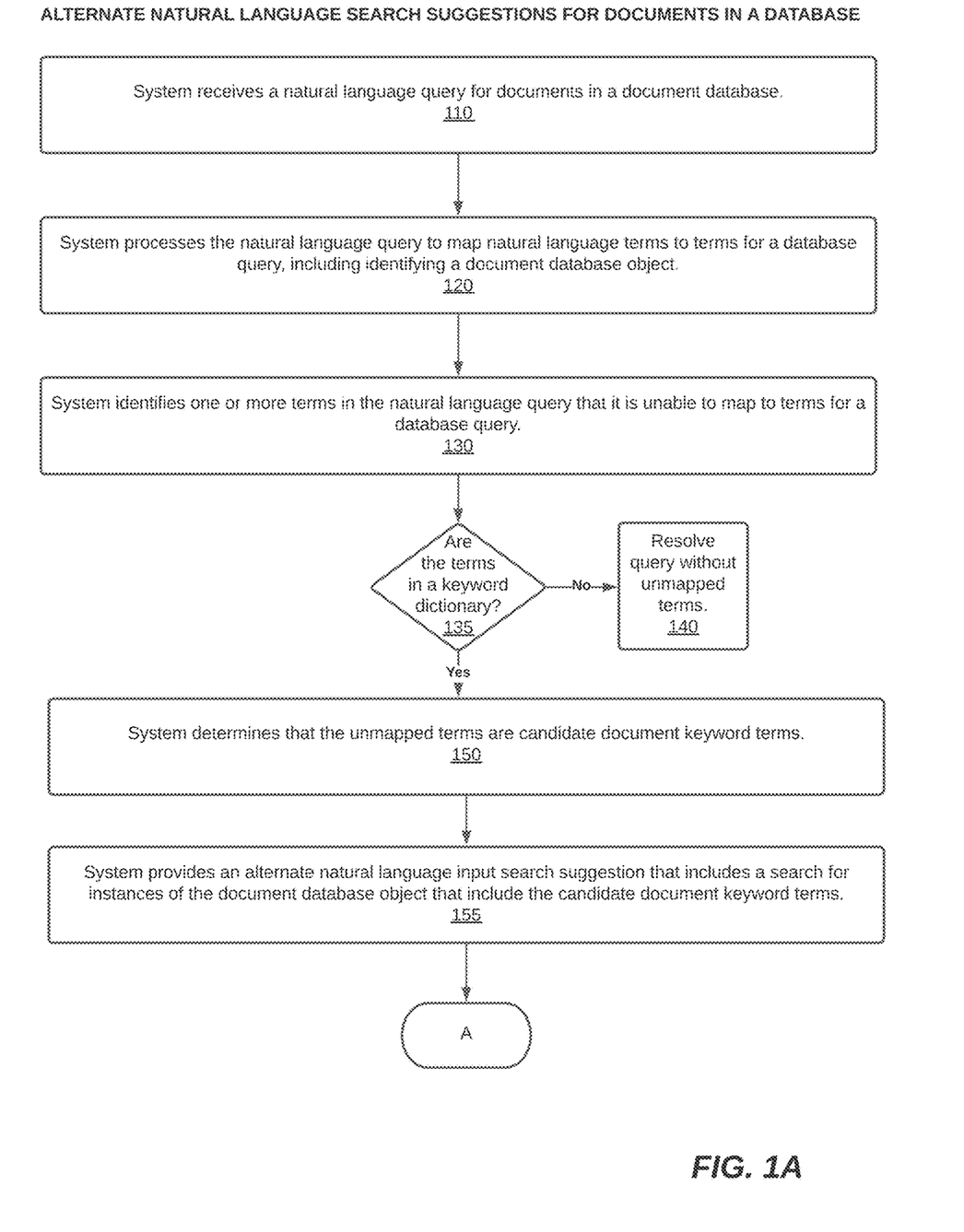
FIGS. 1A-1B are flowcharts that illustrate a method, according to one embodiment, for providing alternate natural language search suggestions for documents in a database.
Figure 1B:
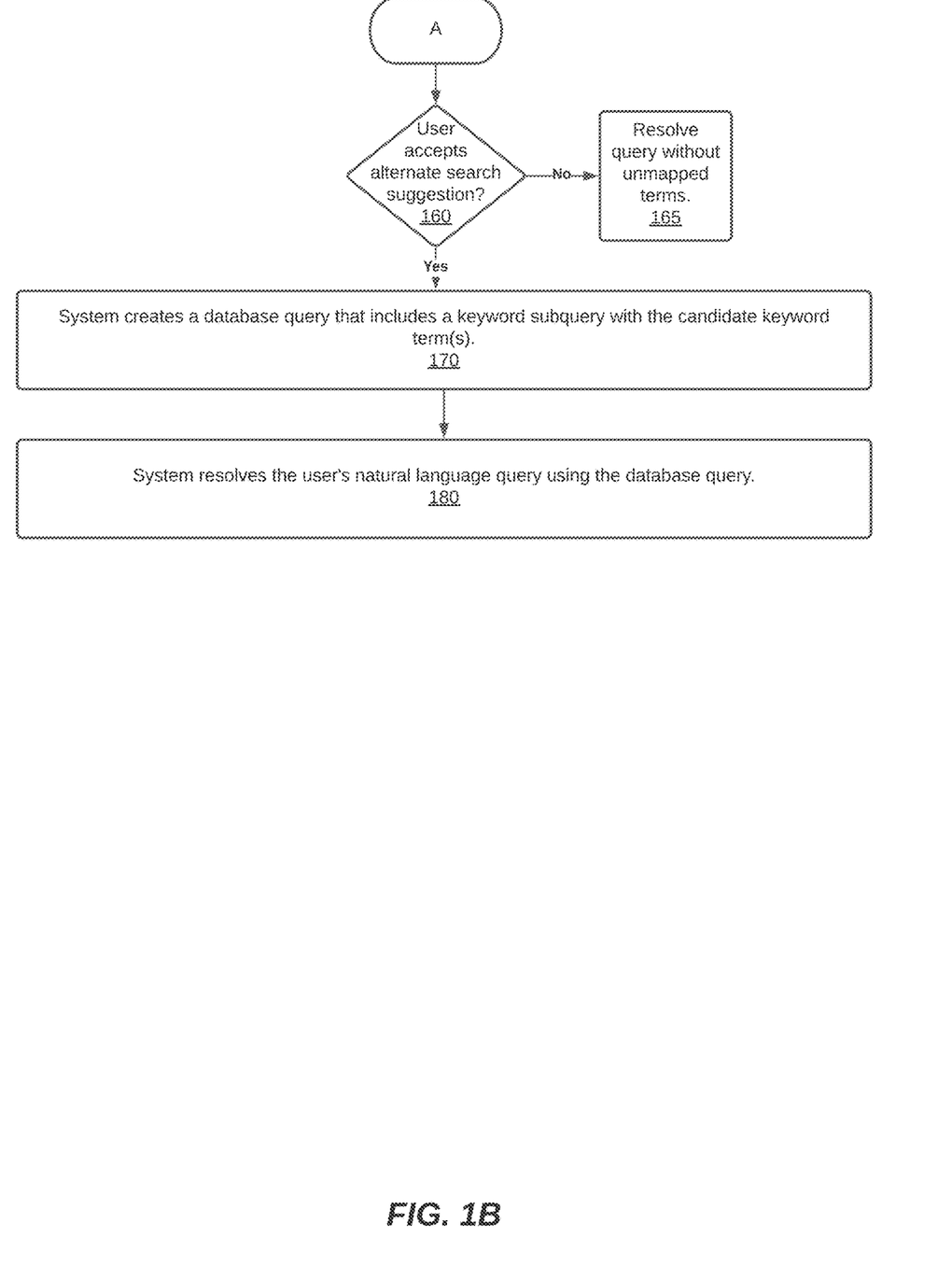

1. Method for Providing Natural Language Search Suggestions for Documents in a Database FIGS. 1A-1B illustrate a method for performing natural language searches for documents in a database using alternate search suggestions. The system receives a user's natural language query for documents in a document database (step 110). One context in which the method may be used is a natural language search interface for an enterprise's documents. For example, a natural language interface to documents stored in a SaaS environment with a cloud-based database. This is specifically for a document search and not a web search.

The system processes the natural language query to map natural language terms to terms for a database query, including mapping one or more natural language terms to one or more database metadata query terms and identifying a document database object that is the subject of the user's natural language query (step 120). In certain embodiments, the document database object corresponds to a document type. In certain embodiments, the system also identifies a database field and a database field value. Further details of how this is accomplished is set forth in U.S. patent application Ser. No. 16/781,940, filed on Feb. 20, 2020, entitled "System, Method, and Computer Program for Converting a Natural Language Query to a Structured Database Query," which is incorporated by reference as if full disclosed herein.

The system identifies one or more terms in the user's natural language query that the system is unable to map to terms for a database query (step 130). In certain embodiments, the unmapped terms are terms that the system does not recognize in the processing step as corresponding to a database search term or a keyword search term. The Query Planner Module 330 (see FIG. 3) does not know what to do with this term. Therefore, the Alternate Search Suggestion Module 370 processes this term. In certain embodiments, after the identifying step, the system first checks to see if the document database object identified in the processing step has document-based keyword search enabled. It only proceeds with the steps relating to the alternate search suggestion if the database object has document-based keyword search enabled.

The system determines whether the terms are in a keyword dictionary (step 135). If not, the system resolves the query without the unmapped terms (step 140). If the system determines that the terms are in a keyword dictionary, the system determines that the unmapped terms are candidate document keyword terms (step 150). In certain embodiments, this is done by looking up the words in the user input in a dictionary of indexed document keywords. The system provides an alternate natural language input search suggestion that includes a search for instances of the document database object that includes the candidate document keyword terms (step 155).

As seen in the table below, the "missed terms" in the table are the unmapped terms that the system determines are candidate document keyword terms. The alternate search suggestion includes both the candidate keyword terms and the terms recognized from the processing step.

| User Input | Missed | Suggestion |
| --- | --- | --- |
| Act of God contracts | Act of God | Act of God in contracts |
| Act of God, ACV over $20k | Act of God | contracts with Act of God, ACV over $20k |
| Act of God and Term contracts that mention Payment Terms | Act of God | . . . contracts that mention Payment Terms and Act of God and Term . . . |
| Act of God MSAs Force Majeure, ACV over $20k, Payment Terms verbiage | Act of God Force Majeure | Act of God in MSAs . . . agreements containing Force Majeure, Payment Terms verbiage . . . |

The system determines whether the user accepted an alternate search suggestion (step 160). If not, the system resolves the query without the unmapped terms (step 165). If the system determines that the user accepted the alternate natural language input search suggestion, the system creates a database query that includes a metadata subquery with database metadata terms and a document keyword subquery that includes the candidate document keyword search term(s) (step 170). The database metadata terms are the database fields and objects. So, a metadata query may include field-value parameters for the search.

The system resolves the user's natural language query using the database query by performing metadata and document keyword searches on the document database based on the metadata subquery and the document keyword subquery (step 180). Further details are described in U.S. patent application Ser. No. 17/556,870, filed on Dec. 20, 2021, entitled "System, Method, and Computer Program for Performing Natural Language Queries for Documents in a Database," which is incorporated by reference as if fully disclosed herein. In certain embodiments, resolving a document keyword subquery comprises determining if there are cached keyword results.

In certain embodiments, mapping natural language terms to database metadata query terms includes mapping database fields and values. In certain embodiments, the processing step includes mapping natural language terms to both database metadata query terms and document keyword query terms. In the processing step, the system may recognize some keywords. However, there may be other keywords that the system does not recognize. It is the unrecognized keywords that are the unmapped terms.

In certain embodiments, if the user's natural language query is a nested query, the system determines the cutoff point between the main and nested object clauses. If the object mentioned is in the nested clause, the system does not proceed. If the object is in the main clause, the system performs the methods described herein.

Figure 2:
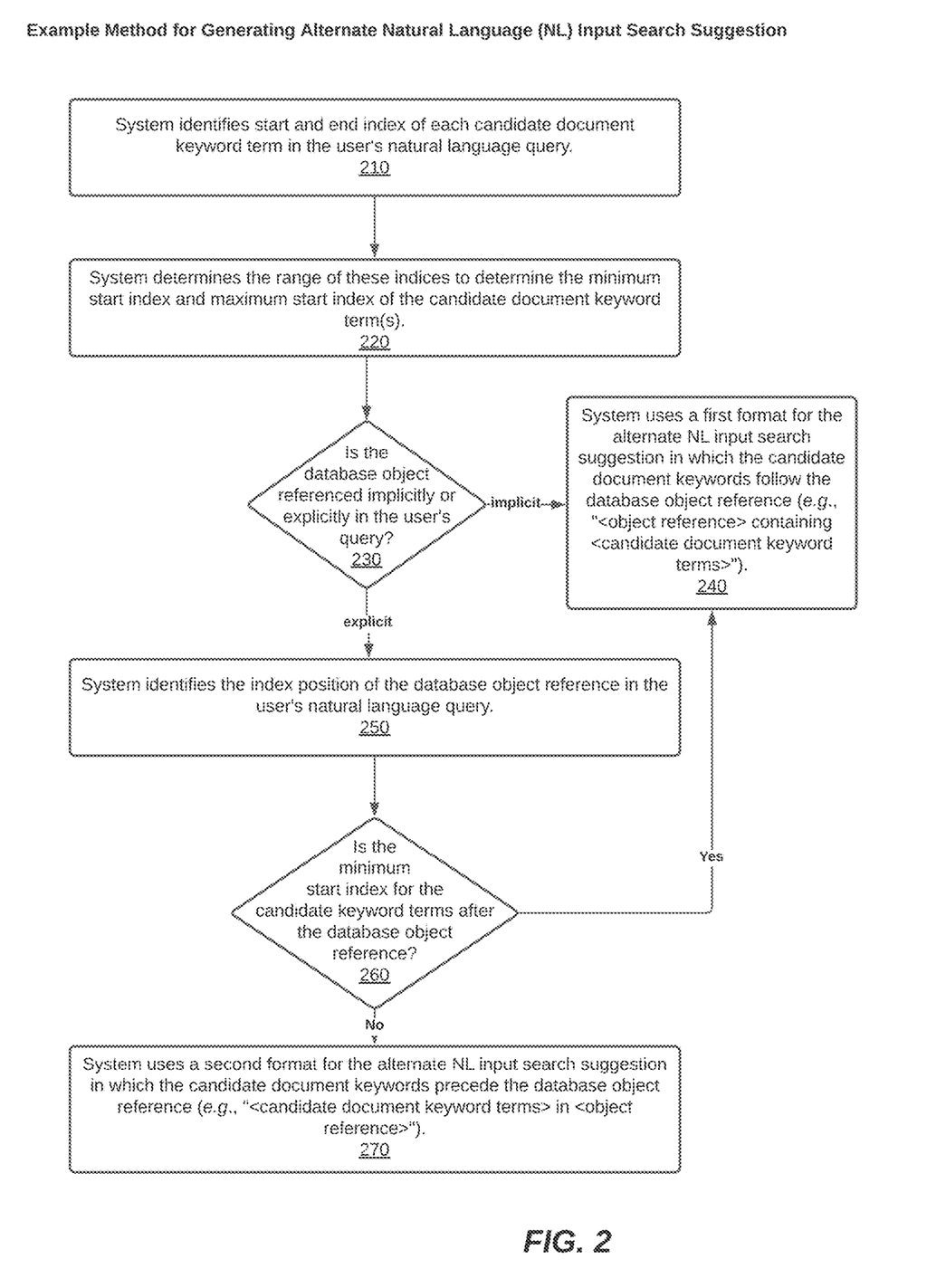
FIG. 2 is a flowchart that illustrates a method, according to one embodiment, for generating an alternate natural language input search suggestion.

2. Method for Generating an Alternate Natural Language Input Search Suggestion FIG. 2 illustrates a method for generating an alternate natural language input search suggestion. The system identifies a start and end index of each candidate document keyword term in the user's natural language query (step 210). The system determines the range of these indices to determine the minimum start index and maximum start index of the candidate document keyword term(s) (step 220).

The system determines whether the database object is referenced implicitly or explicitly in the user's query (step 230). For example, an explicit object reference may be "an Act of God contract," where contract is an explicit reference to the "contracts" database object (i.e., the database table that is for contracts). An implicit object reference may be "an Act of God, ACV over $20K". In this case, the user did not state that they were looking for a contract, but it is implied. In this case, the system would have a rule that if "ACV" (which is a database field for the "contracts" object) is mentioned and there is no explicit database object referenced, then it would default to assuming that "contracts" is the database object.

If the system determines that the database object is referenced implicitly, the system uses a first format for the alternate natural language input search suggestion in which the candidate document keywords follow the database object reference (e.g., "<object reference> containing <candidate document keyword terms>") (step 240). If the system determines that the database object is referenced explicitly, the system identifies the index position of the database object reference in the user's natural language query (step 250).

The system determines whether the minimum start index for the candidate keyword terms is after the database object reference (step 260). If it is, then the system uses the first format for the alternate natural language input search suggestion as described in step 240. If it is not, the system uses a second format for the alternate natural language input search suggestion in which the candidate document keywords precede the database object reference (e.g., "<candidate document keyword terms> in <object reference>") (step 270).

3. Example System Architecture

Figure 3:
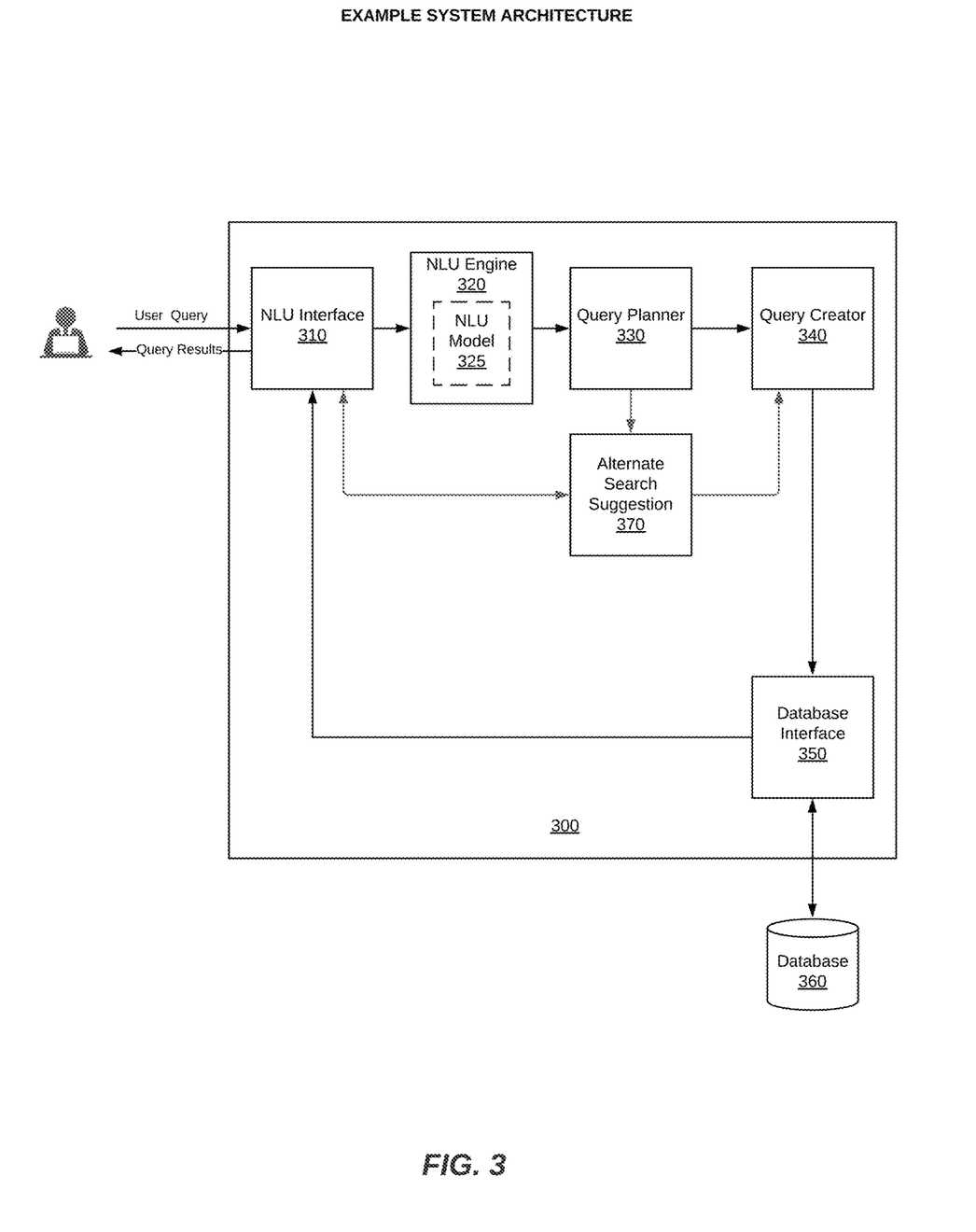
FIG. 3 is a block diagram that illustrates an example system architecture according to one embodiment.

FIG. 3 illustrates an example architecture for a system that performs the methods described herein. However, the methods described herein may be implemented in other systems and are not limited to system 300.

Example system 300 includes an NLU Interface 310, which enables a user to input a natural language query to the system. An NLU Engine 320 applies an NLU model 325 to a user's natural language query, and Query Planner Module 330 creates a query plan in accordance with the method of FIGS. 1A-1B. For example, the Query Planner Module 330 processes the natural language query to map natural language terms to terms for a database query, including identifying a document database object (step 120). But if the system identifies one or more terms in the natural language query that it is unable to map to terms for a database query (step 130), the Alternate Search Suggestion Module 370 determines whether the terms are in a keyword dictionary (step 135), determines that the unmapped terms are candidate document keyword terms (step 150), and provides an alternate natural language input search suggestion that includes a search for instances of the document database object that includes the candidate document keyword terms (step 155). Query Creator Module 340 creates a database query based on the query plan, and provides the database query to Database Interface 350 which serves as an interface to the queried database 360. Query results are return to the NLU Interface 310, which provides the query results to the user. Those skilled in the art will appreciate that system 300 may include additional modules, not relevant to the methods described herein.

4. General

The methods described with respect to FIGS. 1A-3 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for performing natural language searches for documents in a database using alternate search suggestions, the method comprising:

receiving a user's natural language query for a search of a document database, wherein the user's natural language query comprises one or more natural language terms and wherein the search of the document database is performed using a database query comprising one or more database query terms;

processing the user's natural language query by
    mapping the one or more natural language terms to the one or more database query terms, and
    identifying a document database object that is the subject of the user's natural language query;
identifying a term from the one or more natural language terms in the user's natural language query that the system is unable to map to a database query term;
in response to determining that the unmapped term is in a keyword dictionary determining that the unmapped term is a candidate document keyword term;
providing an alternate natural language input search suggestion, wherein the alternate natural language input search suggestion includes a search for instances of the document database object that includes the candidate document keyword term, and wherein providing an alternate natural language input search suggestion further comprises:
    identifying a start index and an end index for the candidate document keyword term in the user's natural language query,
    determining a range of the start index and the end index to determine a minimum start index and a maximum start index for the candidate document keyword term,
    in response to the document database object being referenced explicitly in the user's natural language query, performing the following, wherein the document database object being referenced explicitly comprises the document database object being a term in the one or more natural language terms in the user's natural language query:
        identifying an index position of the document database object referenced in the user's natural language query, wherein the index position comprises the minimum start index for the candidate document keyword term being before or after the document database object referenced in the user's natural language query
        in response to the minimum start index for the candidate document keyword term being after the document database object, using a first format for the alternate natural language input search suggestion in which the candidate document keyword term follows the document database object referenced in the user's natural language query, and
        in response to the minimum start index for the candidate document keyword term being before the document database object, using a second format for the alternate natural language input search suggestion in which the candidate document keyword term precedes the document database object referenced in the user's natural language query,
    in response to the document database object being referenced implicitly in the user's natural language query, using the first format for the alternate natural language input search suggestion in which the candidate document keyword term follows the document database object referenced in the user's natural language query, wherein the document database object being referenced implicitly comprises the document database object not being a term in the one or more natural language terms in the user's natural language query but being implied through associated words in the user's natural language query;
    in response to the user accepting the alternate natural language input search suggestion, creating the database query that includes a metadata subquery with database metadata terms and a document keyword subquery that includes the candidate document keyword term; and
    resolving the user's natural language query by performing metadata and document keyword searches in the document database based on the metadata subquery and the document keyword subquery.

2. The method of claim 1, wherein the processing step includes mapping the one or more natural language terms to the one or more database query terms, including database fields and values.

3. The method of claim 1, wherein the processing step includes mapping the one or more natural language terms to the one or more database query terms and document keyword query terms.

4. The method of claim 1, wherein identifying the document database object comprises identifying that the document database object is being referenced explicitly or the document database object is being referenced implicitly in the user's natural language query.

5. A non-transitory computer-readable medium comprising a computer program, that, when executed by a computer system, enables the computer system to perform the following steps for performing natural language searches for documents in a database using alternate search suggestions, the steps comprising:
    receiving a user's natural language query for a search of a document database, wherein the user's natural language query comprises one or more natural language terms and wherein the search of the document database is performed using a database query comprising one or more database query terms;
    processing the user's natural language query by
        mapping the one or more natural language terms to the one or more database query terms, and
        identifying a document database object that is the subject of the user's natural language query;
    identifying a term from the one or more natural language terms in the user's natural language query that the system is unable to map to a database query term;
    in response to determining that the unmapped term is in a keyword dictionary determining that the unmapped term is a candidate document keyword term;
    providing an alternate natural language input search suggestion, wherein the alternate natural language input search suggestion includes a search for instances of the document database object that includes the candidate document keyword term, and wherein providing an alternate natural language input search suggestion further comprises:
        identifying a start index and an end index for the candidate document keyword term in the user's natural language query,
        determining a range of the start index and the end index to determine a minimum start index and a maximum start index for the candidate document keyword term,
        in response to the document database object being referenced explicitly in the user's natural language query, performing the following, wherein the document database object being referenced explicitly comprises the document database object being a term in the one or more natural language terms in the user's natural language query:

identifying an index position of the document database object referenced in the user's natural language query, wherein the index position comprises the minimum start index for the candidate document keyword term being before or after the document database object referenced in the user's natural language query, in response to the minimum start index for the candidate document keyword term being after the document database object, using a first format for the alternate natural language input search suggestion in which the candidate document keyword term follows the document database object referenced in the user's natural language query, and in response to the minimum start index for the candidate document keyword term being before the document database object, using a second format for the alternate natural language input search suggestion in which the candidate document keyword term precedes the document database object referenced in the user's natural language query, in response to the document database object being referenced implicitly in the user's natural language query, using the first format for the alternate natural language input search suggestion in which the candidate document keyword term follows the document database object referenced in the user's natural language query, wherein the document database object being referenced implicitly comprises the document database object not being a term in the one or more natural language terms in the user's natural language query but being implied through associated words in the user's natural language query;

in response to the user accepting the alternate natural language input search suggestion, creating the database query that includes a metadata subquery with database metadata terms and a document keyword subquery that includes the candidate document keyword term; and resolving the user's natural language query by performing metadata and document keyword searches in the document database based on the metadata subquery and the document keyword subquery.

6. The non-transitory computer-readable medium of claim 5, wherein the processing step includes mapping the one or more natural language terms to the one or more database query terms, including database fields and values.

7. The non-transitory computer-readable medium of claim 5, wherein the processing step includes mapping the one or more natural language terms to the one or more database query terms and document keyword query terms.

8. The non-transitory computer-readable medium of claim 5, wherein identifying the document database object comprises identifying that the document database object is being referenced explicitly or the document database object is being referenced implicitly in the user's natural language query.

9. A computer system for performing natural language searches for documents in a database using alternate search suggestions, the system comprising:
one or more processors;
one or more memory units coupled to the one or more processors, wherein the one or more memory units store instructions that, when executed by the one or more processors, cause the system to perform the operations of:

receiving a user's natural language query for a search of a document database, wherein the user's natural language query comprises one or more natural language terms and wherein the search of the document database is performed using a database query comprising one or more database query terms;

processing the user's natural language query by
mapping the one or more natural language terms to the one or more database query terms, and
identifying a document database object that is the subject of the user's natural language query;

identifying a term from the one or more natural language terms in the user's natural language query that the system is unable to map to database query term;

in response to determining that the unmapped term is in a keyword dictionary, determining that the unmapped term is a candidate document keyword term;

providing an alternate natural language input search suggestion, wherein the alternate natural language input search suggestion includes a search for instances of the document database object that includes the candidate document keyword term, and wherein providing an alternate natural language input search suggestion further comprises:

identifying a start index and an end index for the candidate document keyword term in the user's natural language query, determining a range of the start index and the end index to determine a minimum start index and a maximum start index for the candidate document keyword term, in response to the document database object being referenced explicitly in the user's natural language query, performing the following, wherein the document database object being referenced explicitly comprises the document database object being a term in the one or more natural language terms in the user's natural language query:

identifying an index position of the document database object referenced in the user's natural language query, wherein the index position comprises the minimum start index for the candidate document keyword term being before or after the document database object referenced in the user's natural language query in response to the minimum start index for the candidate document keyword term being after the document database object, using a first format for the alternate natural language input search suggestion in which the candidate document keyword term follows the document database object referenced in the user's natural language query, and in response to the minimum start index for the candidate document keyword term being before the document database object, using a second format for the alternate natural language input search suggestion in which the candidate document keyword term precedes the document database object referenced in the user's natural language query, in response to the document database object being referenced implicitly in the user's natural language query, using the first format for the alternate natural language input search suggestion in which the candidate document keyword term follows the document database object referenced in the user's natural language query, wherein the document database object being referenced implicitly comprises the document database object not being a term in the one or more natural language terms in the user's natural language query but being implied through associated words in the user's natural language query;

in response to the user accepting the alternate natural language input search suggestion, creating the database query that includes a metadata subquery with database metadata terms and a document keyword subquery that includes the candidate document keyword term; and resolving the user's natural language query by performing metadata and document keyword searches in the document database based on the metadata subquery and the document keyword subquery.

10. The computer system of claim 9, wherein the processing step includes mapping the one or more natural language terms to the one or more database query terms, including database fields and values.

11. The computer system of claim 9, wherein the processing step includes mapping the one or more natural language terms to the one or more database query terms and document keyword query terms.

12. The computer system of claim 9, wherein identifying the document database object comprises identifying that the document database object is being referenced explicitly or the document database object is being referenced implicitly in the user's natural language query.

* * * * *